Dec. 29, 1953  R. D. KING  2,663,962
TIP-UP DEVICE FOR FISHING THROUGH ICE
Filed April 4, 1949  2 Sheets-Sheet 1
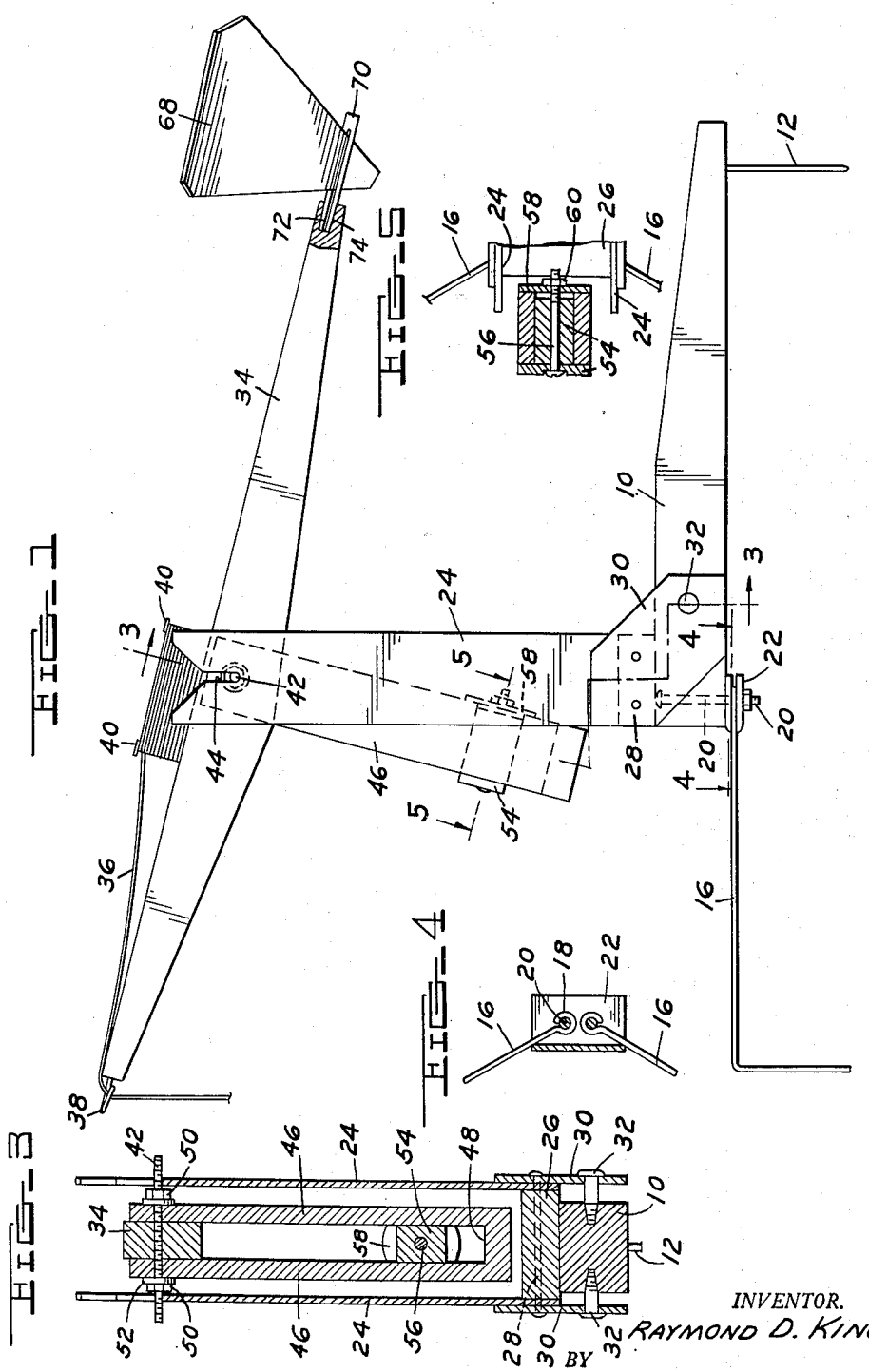
INVENTOR.
RAYMOND D. KING
BY
Burton & Parker
ATTORNEYS Dec. 29, 1953   R. D. KING   2,663,962
TIP-UP DEVICE FOR FISHING THROUGH ICE
Filed April 4, 1949   2 Sheets-Sheet 2
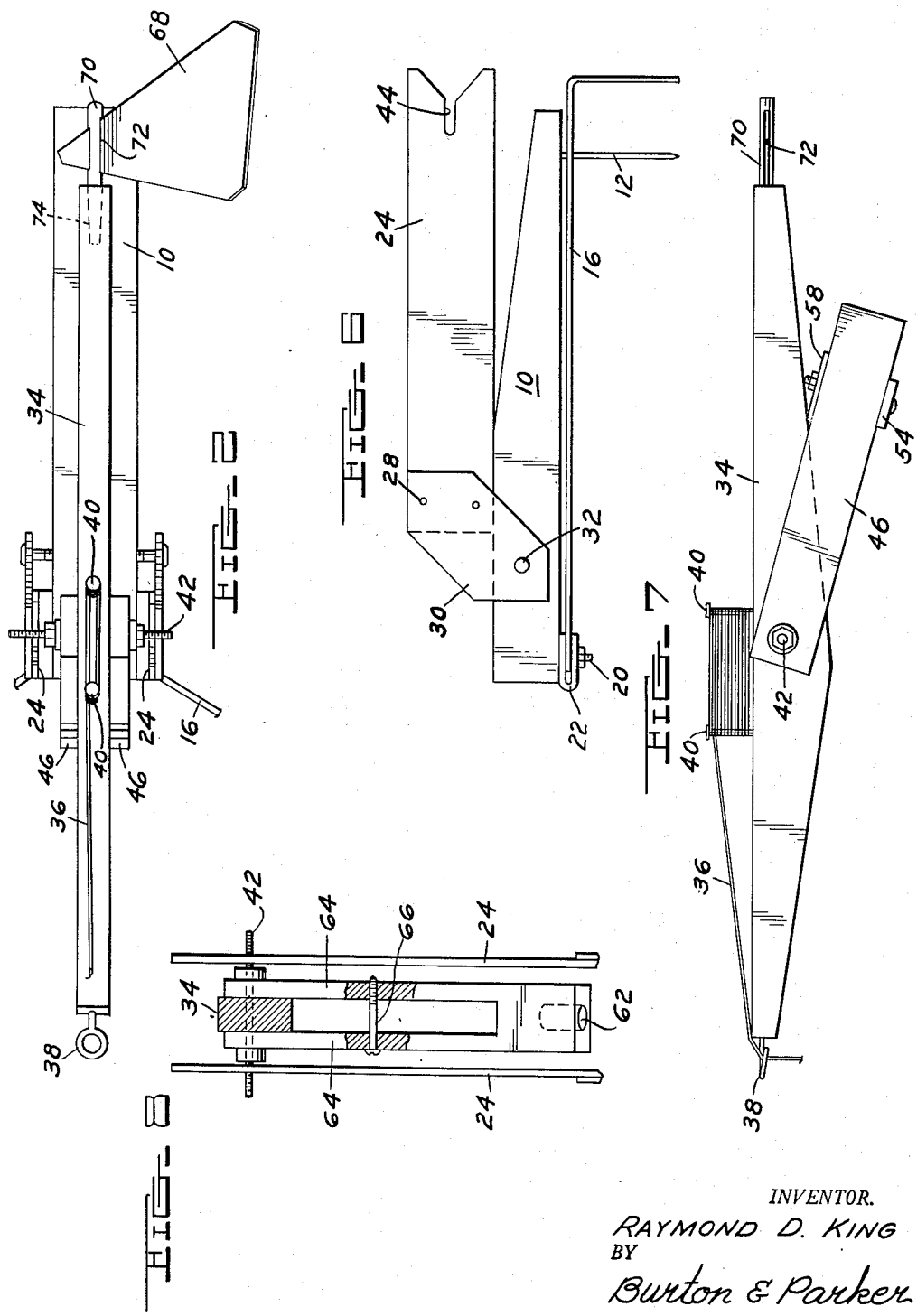
INVENTOR.
RAYMOND D. KING
BY
Burton & Parker
ATTORNEYS Patented Dec. 29, 1953

2,663,962

UNITED STATES PATENT OFFICE 2,663,962

TIP-UP DEVICE FOR FISHING THROUGH ICE

Raymond D. King, Roseville, Mich.

Application April 4, 1949, Serial No. 85,333

9 Claims. (Cl. 43—17)

This invention relates to fishing implements and particularly to a tip-up device for fishing through ice.

An important object of this invention is to provide an efficient, rugged fishing apparatus for fishing through ice which is constructed in a novel manner for a self-operable teetering action and for imposing a continuous pull on the fish line when a bite is obtained. Another important object of the invention is to provide an apparatus of this character which is composed of parts capable of being disassembled for convenient portability and storage and which is further capable of being quickly assembled for operation without difficulty. A further important object of the invention is to provide a device of this character having novel means which is automatically responsive to the movement of the air for moving the fish line up and down and which also serves as a signalling implement.

In carrying out the invention, the device comprises a base portion supported directly on the ice, an upright member supported on the base portion, and a teetering arm to one end of which the fishing line is attached. An important novel feature of the device is the provision for weighting the arm so that when a nibble is obtained there is a resisting force imposed on the line which improves the possibility of catching the fish. Associated with the arm is a novel signalling device which also serves to automatically rock or oscillate the arm and thereby alternately raise and lower the fishing line. This signalling device is in the form of a stiff vane capable of rotatable adjustment to vary its angularity with respect to the horizontal and which is responsive to the movement of the air to teeter or rock the arm. In one illustrated embodiment of the invention, the counter-weight means is adjustable to vary the resisting force thereof and between this adjustment and the adjustment provided by the vane it is possible to preset the apparatus for the desired rocking movement and pull on the line.

Various other objects, advantages and meritorious features of the invention will become more fully apparent from the following specification, appended claims and accompanying drawings wherein:

Fig. 1 is a side elevation of one embodiment of the invention illustrating the device in upright position on ice and in non-signalling position, Fig. 2 is a top plan view of the device, Fig. 3 is a vertical sectional view taken along line 3—3 of Fig. 1, Fig. 4 is a detail horizontal sectional view taken along line 4—4 of Fig. 1, Fig. 5 is a detail sectional view taken along line 5—5 of Fig. 1 illustrating the adjustability of the counter-weight, Figs. 6 and 7 illustrate the collapsed positions of the parts of the device for convenient storage and portability, and Fig. 8 is a vertical sectional view similar to Fig. 3 illustrating a modified form of construction.

As heretofore mentioned, the device is intended for fishing through ice and for that purpose a base is provided which rests upon the ice and holds the device from movement relative thereto. The base comprises an elongated horizontal member 10 supported at the rear end by a vertical pin 12 and at the other end by two normally laterally diverging legs 16—16 as shown in Figs. 1 and 4. The forward ends of the legs 16—16 are downwardly bent for engagement with the ice to support the base member 10 in horizontal spaced relationship to the surface of the ice. The rear end of each leg 16 is bent into an eye 18 as shown in Fig. 4 and is pivotally connected to a depending bolt 20 which serves also to secure a U-shaped bracket member 22 in which the legs 16—16 are received for swinging movement. The closed end of the U-shaped member 22 serves as a stop for the legs limiting their forward swinging movement to the position shown in Fig. 4. The legs 16—16 are capable of being swung rearwardly until they assume a position under the base member 10 and parallel thereto, as shown in Fig. 6.

Supported by the base member is an upright member or standard which, as shown in Fig. 3, is actually composed of two laterally spaced apart parallel extending members 24—24. The base ends of these two members are connected together by a block 26 which in the upright position of the standard bears upon the base 10. Two or more bolt members 28 are employed to secure the side members 24—24 to the block 26. The standard as a unit is capable of being swung from its upright position shown in Fig. 2 to a horizontal folded position shown in Fig. 6. For this purpose, the upright member is provided with plates 30—30 which are secured to the lower ends of the members 24—24 by the pins 28 previously described. The plates 30 project beyond the block 26 as shown in Fig. 3 and overlap upon the sides of the base 10. Pivot pins 32 couple the plates to the base 10 to provide swinging movement of the upright in the manner shown by a comparison of Figs. 1 and 4, the pins 32 serving as an axis about which the upright is swung.

Rockingly supported by the upright 24 is a teetering member or bar 34 which carries a fish line 36. The line 36 is passed through an eye 38 on the forward end of the bar and thereafter extends vertically downwardly into the hole cut through the ice for the purpose of fishing therethrough. The opposite end of the fish line may be wound upon any suitable type of spool and is illustrated herein as being wound about two longitudinally spaced elements in the form of nails 40—40 which are driven into the upper side of the teetering bar adjacent to its pivotal axis and project thereabove. The bar 34 is relatively thin as shown in Fig. 3 and is received between the upper portions of the members 24—24 in spaced relationship thereto. Extending transversely through the bar approximately midway of its opposite ends is a member or pin 42 which as shown in Fig. 3 projects beyond the opposite sides of the bar and through the members 24—24. To facilitate assembly and disassembly, each member 24 is provided, as shown in Fig. 1, with a vertical slot 44 which opens upwardly through the upper edge of the member and is preferably provided with diverging walls as shown to facilitate assembly. The projecting ends of the pin 42 are received in the slots 44 and removably supported on the closed ends thereof. In this manner, the bar 34 is capable of rocking or teetering about the axis formed by the pin 42.

Associated with the teetering bar 34 is a novel device for imposing a tautness or a resisting force on the line when a bite is obtained which increases the likelihood of making a successful catch. This means is a counterweight in the form of a U-shaped member comprising two side sections 46—46 and a closed bottom end section 48 as shown in Fig. 1. The upper ends of the side sections of the counterweight are transversely bored to provide holes for receiving the pivot pin 42. In this manner, with the pin 42 extending therethrough, the counterweight is suspended from the teetering bar 34 and is capable of swinging movement around the axis of the pin and relative to the teetering bar. To hold the counterweight arm against movement relative to the teetering bar, means is provided for clamping the two together for joint swinging or oscillating movement. This means, as shown in Fig. 3, comprises externally threading the pin 42 and providing nuts 50—50 which are threaded thereon and which are located between the side sections 46—46 of the counterweight and the members 24—24 of the upright. Preferably a washer or other suitable element 52 is provided between each nut and its respective side section 46 to increase the compression exerted by the nut.

When the nuts 50 are threaded tightly upon the pin 42, the side sections 46—46 of the counterweight are securely clamped to the teetering bar and the two act in unison to oscillate about the pivotal axis formed by the pivot pin 42. It is obvious that upon slightly unthreading either one or both of the nuts 50—50 the counterweight arm may be loosened relative to the teetering bar to permit angular adjustment of the former relative to the latter to change the oscillating action of the bar and its resistance to any bite upon the fish line.

In the embodiment illustrated in Figs. 1 to 7, the weight in the counterweight is adjustable. The weight is indicated at 54 and comprises a relatively heavy metal block which is shaped for slidable movement in the space between the side sections 46—46 of the arm. As shown in Fig. 5, one end of the weight 54 is flanged for abutting engagement with the side edges of the sections 46—46. A bolt 56 extends through the counterweight and projects from the opposite end thereof. Mounted on the projecting end of the bolt is a plate 58 which is secured in position by a nut 60 threaded on the bolt. By virtue of the nut and plate assembly and its cooperation with the head of the bolt at the opposite end, the weight is adjustably clamped in position along the track provided by the side sections 46—46. The weight may be moved up and down and clamped in adjustable position on the arm. This adjustment will vary the teetering action of the bar 34 and depending on its location on the arm will either increase or decrease the resistance of the teetering bar to a pull on the line.

In Fig. 8, a modified form of counterweight arm is illustrated wherein in place of an adjustable weight a fixed weight 62, such as lead, is locked within a recess in the bottom end of the counterweight arm. The side sections of this modified form of counterweight arm are indicated at 64—64 and the upper ends thereof straddle the teetering bar 34 as in the previously described embodiment and are capable of being removably clamped thereto for joint swinging movement. For this purpose, there is provided a bolt 66 approximately midway between the ends of the section 64 which when threaded in one direction draws the sections 64—64 toward one another and compressively clamps the upper ends thereof to the teetering bar. The remaining parts of the modification of Fig. 8 correspond to the parts hereinbefore described and are provided with like reference numbers.

An important novel feature of the invention is the provision of means for automatically causing the teetering bar to rock and thereby impose an up and down movement on the fish line and the lure or bait attached thereto. This means also serves as a signalling device while also cooperating with the counterweight arm to obtain the desired teetering action. Referring to Figs. 1 and 2, there is provided at the rear end of the teetering bar 34 a vane 68 which may be of the general triangular shape shown. The vane, which is preferably a flat metal sheet, is removably attached to a shaft or pin 70 projecting from the rear end of the teetering bar. The pin 70 is provided with a slot 72 in which any desired corner of the vane 68 may be inserted, which slot opens out through the inner end of the pin 70 as shown in Fig. 1. The inner end of the pin 70 is received in a bored socket or recess opening out through the rear end of the teetering bar having a diameter preferably slightly less than the outer diameter of the pin so as not only to compress the inner end sections of the pin toward one another but also to hold the pin in any rotatable adjustable position. For this purpose, either the recess 74 in which the pin is received or the slotted end of the pin itself may be tapered. It is obvious from the construction thus far described that the pin 70 may be loosened in the recess in which it is received and rotated to any desired position to vary the inclination of the vane to the horizontal.

The vane 68, as previously mentioned, serves as a signalling device as is customary in tip-up devices of this character. When a bite is obtained and a fish is caught on the line, the teetering bar is swung counterclockwise as viewed in Fig. 1 to elevate the rear end of the teetering bar and project it in substantially vertical position. Thus elevated, the vane 68 is raised approximately directly above the upright and in this position signals to the fisherman that a bite has been obtained.

The vane 68 also serves, as previously mentioned, as a means for causing an automatic teetering action on the bar 34. The device of the present invention is preferably mounted on the ice substantially cross-wise to the wind. Thus mounted, and with the vane 68 at the desired tilted position, the wind action on the vane will cause the bar 34 to rock or oscillate about the axis formed by the pin 42. The device is therefore responsive to wind movements and is self-operable to alternately pull in and let out on the fish line so as to impart a life-like movement to the lure on the end of the fish line. The adjustable character of the pin 70 which holds the vane 68 enables the latter to be inclined at the desired inclination depending upon the velocity of the wind. In a relatively high wind, the pin may be rotated to swing the vane to a position where it extends at a relatively small angle to the horizontal. Conversely, when the velocity of the wind is relatively low, the vane may be swung so that it extends at quite a large angle to the horizontal to interpose a larger surface to the air current. In use, any corner of the vane 68 may be inserted in the slot 72 of the pin and in this manner vary the distance between the center of the surface area of the vane to the axis of the teetering bar.

What I claim is:

1. A fishing device comprising, in combination, an upright member, a teetering bar pivotally supported intermediate its ends on the upper end of the upright member for rocking movement about a horizontal axis, means adjacent to one end of the bar for suspending a fish line therefrom, a relatively stiff vane attached adjacent to the opposite end of the bar and inclined to the vertical plane, said vane being responsive to the wind to teeter the bar about its rocking axis, a weighted counterbalancing arm connected to the bar adjacent to the rocking axis thereof and depending downwardly from the bar, means providing adjustment of the arm to different angles with respect to the bar to vary the counterbalancing action thereof, and means providing adjustment of the weight carried by the arm to different positions either closer to or further away from the bar to vary the teetering action of the bar in different wind conditions.

2. A fishing device comprising a standard, a member having a substantially longitudinal extent pivotally mounted on the standard and having a weight depending therefrom intermediate its ends, means adjacent to one end of the member for suspending a fish line therefrom, a vane extending outwardly from the member on the opposite side of the standard to that from which the fish line depends, a shaft rigidly secured to the vane and frictionally secured within the member, said member having a socket to frictionally receive the shaft whereby the vane can be adjusted to various angular positions with respect to the plane upon which the standard is supported such that a current of air moving across the vane will cause the member to rock on its pivot.

3. A fishing device comprising a standard, a member having a substantially longitudinal extent pivotally mounted on the standard and having a weight depending therefrom intermediate its ends, means adjacent to one end of the member for suspending a fish line therefrom, a vane extending outwardly from the member on the opposite side of the standard to that from which the fish line depends, a shaft rigidly secured to the vane and frictionally secured within the member, said member having a socket to frictionally receive the shaft, said shaft being substantially coincident with the longitudinal axis of the member whereby the vane can be adjusted to various angular positions with respect to the plane upon which the standard is supported such that a current of air moving in a direction transverse of the longitudinal axis of the member will cause the member to rock on its pivot.

4. A fishing device comprising, in combination, a standard, a member having a substantially longitudinal extent pivotally mounted intermediate its ends on the standard, a weighted counterbalancing arm depending from the member intermediate its ends, means adjacent to one end of the member for suspending a fish line therefrom, a vane extending outwardly from the member adjacent to the opposite end thereof, a shaft connecting said vane to said member, said member having a socket to frictionally receive the shaft whereby the vane can be adjusted to various angular positions with respect to the plane upon which the standard is supported such that a current of air moving thereagainst will cause the member to rock on its pivot, and means providing adjustable movement of the weight carried by said arm either toward or away from the member to vary the rocking movement thereof.

5. A fishing device comprising, in combination, an upright member, a cross member pivotally supported intermediate its ends on the upper end of the upright member for rocking movement about a horizontal axis, means on one end of the cross member for suspending a fish line therefrom, a relatively stiff vane, a supporting shaft for the vane extending into the cross member adjacent to the end thereof opposite to the fish line suspending means, said shaft being rotatively adjustable about its axis relative to the cross member to vary the inclination of the vane between the horizontal and vertical planes, said vane when so adjustably inclined being responsive to the wind to rock the cross member about said horizontal axis, a weighted counter-balancing arm, means pivotally suspending one end of the arm from the cross member adjacent to the rocking axis thereof and providing angular movement of the arm relative to the cross member in the vertical plane thereof, and means for releasably locking the arm in a desired angular relation to the cross member to counterbalance the effect of the wind on the vane.

6. In a device for fishing through ice, an upright, a cross member pivotally supported intermediate its ends on the upper end of the upright, means on one end of the cross member for suspending a fish line therefrom, and means for teetering the cross member in response to wind currents comprising a relatively stiff vane, and slotted means releasably secured to said cross member securing the vane to the cross member adjacent to the end thereof opposite to the fish line suspending means and at an angle inclined to the horizontal and vertical planes.

7. In a device for fishing through ice, a teetering arm pivotally supported intermediate its ends about a horizontal axis, means adjacent to one end of the arm for suspending a fish line therefrom, a vane carried by the arm adjacent to the other end thereof and inclined at an angle intermediate the vertical and horizontal planes so as to be responsive to wind currents to teeter the arm, and means for changing the angularity of the vane and for holding the vane in any angular position to which it is adjusted.

8. In a device for fishing through ice, an upright member, a teetering bar pivotally supported intermediate its ends on the upper end of the upright member for rocking movement about a horizontal axis, slotted means releasably secured to said cross member for suspending a fish line from one end of the bar, a relatively stiff vane, means for attaching said vane to the bar at an angle inclined to the vertical and horizontal planes, said vane being responsive to wind currents to teeter the bar about its rocking axis, a counter-balancing arm connected at one end to the bar adjacent to its rocking axis and depending downwardly from the bar, means providing adjustment of the arm to different angles with respect to the bar in the vertical plane thereof to vary the counter-balancing action of the arm, a weight carried by the arm, and means providing adjustment of the weight to different positions along the arm either closer to or further away from the bar to vary the resistance of the bar to the teetering action imparted thereto by the force of the wind.

9. In a device for fishing through ice, an upright, a teetering bar pivotally supported intermediate its ends on the upper end of the upright for rocking movement about a horizontal axis, means on one end of the teetering bar for suspending a fish line therefrom, a relatively stiff vane, means attaching said vane to the teetering bar at an angle inclined to the vertical and horizontal planes, said vane being responsive to wind currents to teeter the bar about its rocking axis, and means for varying the teetering action of the bar imparted thereto by the force of the wind acting on said vane comprising a weight which is movable toward and away from the rocking axis of the bar.

RAYMOND D. KING.

References Cited in the file of this patent

UNITED STATES PATENTS

| Number | Name | Date |
| --- | --- | --- |
| 223,872 | Ashford | Jan. 27, 1880 |
| 1,428,918 | Spieth | Sept. 12, 1922 |
| 2,122,836 | Gegerfeldt | July 5, 1938 |
| 2,530,864 | Easterday | Nov. 21, 1950 |

OTHER REFERENCES

Popular Mechanics of February 1939, page 279.